United States Patent [19]

Sasaki et al.

[11] Patent Number: 4,966,942
[45] Date of Patent: Oct. 30, 1990

[54] POLYCARBONATE RESIN COMPOSITION WITH ACRYLIC IMPACT MODIFIERS

[75] Inventors: Ichiro Sasaki, Suita; Junji Oshima, Toyonaka; Minoru Yamada, Kawanishi, all of Japan

[73] Assignee: Takeda Chemical Industries, Ltd., Osaka, Japan

[21] Appl. No.: 218,296

[22] Filed: Jul. 13, 1988

[30] Foreign Application Priority Data

Jul. 16, 1987 [JP] Japan .................................. 62-177969

[51] Int. Cl.$^5$ ............................................. C08L 69/00
[52] U.S. Cl. ........................................ 525/67; 525/69; 525/902
[58] Field of Search ...................... 525/67, 64, 69, 902

[56] References Cited

U.S. PATENT DOCUMENTS

| | | | |
|---|---|---|---|
| 4,180,494 | 12/1979 | Fromuth et al. | 525/67 X |
| 4,264,487 | 4/1981 | Fromuth et al. | 525/67 X |

*Primary Examiner*—Theodore E. Pertilla

[57] ABSTRACT

A polycarbonate resin composition which comprises:
50–80% by weight of a polycarbonate resin,
20–45% by weight of a poly(1,4-butylene terephthalate) resin and
5–30% by weight of an impact modifier, based on the resin composition, respectively, the impact modifier being a core-shell polymer comprising a core composed of a cross-linked rubbery polymer of an alkyl acrylate wherein the alkyl has 2–8 carbons and a shell composed of a homopolymer or a copolymer of methyl methacrylate which has a glass transition temperature of not less than 60° C., and the core-shell polymer having an acetone soluble fraction of not more than 3% by weight based on the core-shell polymer.

5 Claims, No Drawings

POLYCARBONATE RESIN COMPOSITION WITH ACRYLIC IMPACT MODIFIERS

This invention relates to a polycarbonate resin composition, and particularly to a polycarbonate resin composition which contains poly(1,4-butylene terephthalate) resins and acrylic impact modifiers comprising a multiple stage core-shell polymer with a core of rubbey cross-linked polyacrylic acid ester polymers, and has an improved impact resistance at low temperatures, in particular as low as −30° C.

Polycarbonate resins possess on the whole excellent heat resistance and mechaical characteristics such as impact strength, and therefore have been widely applied to industrial materials such as electric appliances or machine parts, but also daily necessities. On the other hand, polycarbonate resins, as well known, have a large dependence of impact strength on thickness of molded articles, and in addition, a high melt viscosity so that they are insufficient in moldability. The resins are also insufficient in resistance to organic solvents. These defects of the resins have been hindering application of the resins to exterior panels of automobiles, or external equipment or appliances such as bumpers or spoilers etc.

Therefore, there have been proposed a variety of polycarbonate blends to improve the thickness dependency of impact strength and fluidity in molding. Such blends include dienic polymers such as acrylonitrile-styrene-butadiene copolymers (ABS resins), methyl methacrylate-styrene-butadiene copolymers (MBS resins) or styrene-butadiene block copolymers (SBS resins), olefinic resins such as polyethylenes or hydrogenated styrene-butadiene block copolymers (SEBS resins), or acrylic resins such as acrylonitrile-styrene-acrylic acid esters copolymers (AAS resins).

As set forth, the blending of polycarbonate resins with, for example, ABS resins, certainly improves the thickness dependence of impact strength and fluidity in molding, however, the blending is attended by the decrease in heat resistance, and further by the decrease in mechanical properties such as tensile strength or flexural modulus.

It is also known that the blending of polycarbonate resins with polybutylene terephthalate resins improves the resistance to organic solvents and fluidity in molding, as is disclosed in Japanese Patent Publication No. 53-12537, but the polymer blends have a much lower impact strength than the polycarbonate resins.

A further polymer blend has been proposed in, for example, U.S. Pat. No. 4,257,937, which is a polymer blend of polybutylene terephthalate resins, relatively small amounts of polycarbonate resins and core-shell polymers with a core of polyacrylate polymers as impact modifiers. However, this polymer blend has been found insufficient in impact strength at low temperatures.

A still further polymer blend has been also proposed in Japanese Patent Laid-open No. 59-166556. The polymer blend is composed of polycarbonate resins, poly(1,4-butylene terephthalate) resins and, as an impact modifier, graft acrylate copolymers which are prepared by graft copolymerization of vinyl monomers with copolymers of alkyl acrylates/conjugated diene monomers, and has a relatively improved impact strength at low temperatures of about −10° C.

There has been also proposed a polymer composition similar to the above in Japanese Patent Laid-Open No. 53-129246, which comprises saturated polyesters such as polyethylene terephthalate or polybutylene terephthalate resins, polycarbonate resins and core-shell polymers as prepared by the polymerization of not more than 50% by weight of at least one of aromatic hydrocarbon monomers and methacrylic acid ester monomers in the presence of not less than 50% by weight of rubbery polymers mainly composed of alkyl acrylates or alkyl methacrylates wherein the alkyl has 2-10 carbons, and optionally other vinyl monomers.

However, the polymer blends as above mentioned have been found still insufficient in impact strength at much lower temperatures, for examples, as low as about −30° C.

The present inventors have made intensive investigations to improve the aforesaid insufficient impact strength at low temperatures, in particular as low as about −30° C., and have found that the blending of polycarbonate resins with poly(1,4-butylene terephthalate) resins together with core-shell polymers with a core comprising specific cross-linked rubbery polyacrylate polymers and a shell comprising specific glassy methyl methacrylate (co) polymers greatly improves the impact strength at low temperatures without deterioration of the other desired properties as very often inescapable.

It is therefore an object of the invention to provide a polycarbonate resin composition which has an improved impact strength at low temperatures, in particular even at temperatures as low as −30° C.

According to the invention, there is provided a polycarbonate resin composition which comprises:
50–80% by weight of a polycarbonate resin,
20–45% by weight of a poly(1,4-butylene terephthalate) resin and
5–30% by weight of an impact modifier, based on the resin composition, respectively,
the impact modifier being a core-shell polymer comprising a core composed of a cross-linked rubbery polymer of an alkyl acrylate wherein the alkyl has 2–8 carbons and a shell composed of a homopolymer or a copolymer of methyl methacrylate which has a glass transition temperature of not less than 60° C., and the core-shell polymer having an acetone soluble fraction of not more than 3% by weight based on the core-shell polymer.

The polycarbonate resins per se are already well known in the art, and bis(hydroxyaromatic)alkane polycarbonate resins are preferred in the invention. Such polycarbonate resins are produced by the reaction of a bis(hydroxyaromatic)alkane, for example, bis(4-hydroxyphenyl)methane, bis(4-hydroxyphenyl)ethane, 2,2′-bis(4-hydroxyphenyl)propane or 2,2′-bis(4-hydroxy-3,5-dichlorophenyl)propane, with phosgene or diphenyl carbonate. When a polycarbonate resin prepared by the reaction of 2,2′-bis(4-hydroxyphenyl)propane with phosgene is used, the resin has preferably a viscosity average molecular weight of from $2.2 \times 10^4$ to $3.1 \times 10^4$. These polycarbonate resins are available from a number of sources. The polycarbonate resin is used singly or as a mixture of two or more.

The poly(1,4-butylene terephthalate) resin is also available commercially or can be produced by known methods as by heating together terephthalic acid or dimethyl terephthalate and an excess of tetramethylene glycol at elevated temperatures and thereafter heating the reaction mixture in the absence of air and presence of nitrogen or other inert gases for some hours until a desired intrinsic viscosity is reached, as described in U.S. Pat. Nos. 2,465,319 and 3,047,539, for example.

The impact modifier used in the invention is a core-shell polymer comprising a core composed of a cross-linked rubbery polymer of an alkyl acrylate wherein the alkyl has 2-8 carbons and a shell composed of a glassy methyl methacrylate polymer which has a glass transition temperature of not less than 60° C., preferably of not less than 80° C., and the core-shell polymer has an acetone soluble fraction of not more than 3% by weight based on the core-shell polymer.

The alkyl acrylate used in the preparation of the core of the core-shell polymer has an alkyl of 2-8 carbons, and include, for example, ethyl acrylate, propyl acrylate, butyl acrylate and 2-ethylhexyl acrylate, among which is preferred butyl acrylate.

The core is composed of rubbery cross-linked polyalkyl acrylates prepared by the copolymerization of the alkyl acrylate with cross linkable monomers. The cross linkable monomers usable include, for example, aromatic divinyl monomers such as divinylbenzene, alkanepolyol polyacrylates or polymethacrylates such as ethylene glycol diacrylate, ethylene glycol dimethacrylate, butylene glycol diacrylate, butylene glycol dimethacrylate, oligoethylene glycol diacrylate, oligoethylene glycol dimethacrylate, trimethylolpropane diacrylate, trimethylolpropane dimethacrylate, trimethylolpropane triacrylate or trimethylolpropane trimethacrylate, and unsaturated carboxylic acid allyl esters such as allyl acrylate, allyl methacrylate or diallyl maleate. The cross linkable monomer may be used in amounts of about 0.01-5% by weight, preferably of about 0.1-2% by weight based on the monomers used.

The shell of the core-shell polymer is composed of (co)polymers of methyl methacrylate and optionally a second monomer copolymerizable with methyl methacrylate. The second monomers include, for example, aromatic monovinyl monomers such as styrene or α-methylstyrene, monovinyl cyanide monomers such as acrylonitrile or methacrylonitrile, acrylate monomers such as methyl acrylate, ethyl acrylate, hydroxyethyl acrylate or glycidyl acrylate, or methacrylate monomers such as butyl methacrylate, hydroxyethyl methacrylate or glycidyl methacrylate. The shell also may be cross-linked as in the core by use of the cross linkable monomers as described before. The cross linkable monomers may be used in amounts of about 0.01-5% by weight, preferably of about 0.1-2% by weight based on the total monomers used.

It is preferred that the core-shell polymer comprises a core in amounts of 40-80% by weight and a shell in amounts of 60-20% by weight, based on the core-shell polymer, respectively. When the core-shell polymer has a core in amounts of less than 40% by weight based on the core-shell polymer, the resultant polycarbonate resin composition is still insufficient in impact strength at low temperatures, whereas when the core-shell polymer has a core in amounts of more than 80% by weight based on the core-shell polymer, the resultant polycarbonate resin composition is insufficient in moldability and is attended by problems in processing. A core-shell polymer composed of 50-70% by weight of a core and 50-30% by weight of a shell, each based on the core-shell polymer, is especially preferred in the invention.

Meanwhile, when the shell has a glass transition temperature of less than 60° C., the resultant polycarbonate resin composition is of insufficient heat resistance.

The core-shell polymer used in the invention has an acetone soluble fraction of not more than 3% by weight based on the core-shell polymer. The acetone soluble fraction is defined as the percentage of the core-shell polymer dissolved in acetone in amounts of 100 times in weight as much as the polymer after dispersing the polymer therein and standing at room temperatures for 24 hours.

According to the invention, the use of the core-shell polymer which has an acetone soluble fraction specified as above as an impact modifier greatly improves impact strength at low temperatures without deterioration of the other desired properties such as heat resistance or mechanical strength. The use of core-shell polymers which have an acetone soluble fraction of more than 3% by weight as an impact modifier remarkably reduces the impact resistance at low temperatures.

The core-shell polymer is often called a multiple stage polymer in the literature, and has a first stage polymer called the core and the final stage polymer called the shell. The core-shell polymer may be prepared sequentially by emulsion polymerization wherein each successive outer stage coats the previous stage polymer, as is described in, for example, U.S. Pat. No. 4,034,013. By way of example, butyl acrylate and a cross linkable monomer, for example, ethylene glycol dimethacrylate and allyl methacrylate, are first emulsion copolymerized to prepare a polybutyl acrylate latex, and then in the presence of the latex particles as cores, methyl methacrylate and optionally a cross linkable monomer such as ethylene glycol dimethacrylate are subjected to emulsion polymerization to cover the core, thus forming a shell. The core-shell polymers are also commercially available, if desired.

The core-shell polymer used in the invention is usually a two stage polymer composed of a core as the first stage polymer and a shell as the final stage polymer, however, the core-shell polymer may contain middle stage polymers between the core and the shell. The middle stage polymers may be composed of homopolymers or copolymers of alkyl acrylates or methacrylates wherein the alkyl has preferably 1-4 carbons, e.g., methyl acrylate or ethyl acrylate, aromatic vinyl monomers such as styrene or α-methylstyrene, vinyl cyanide monomers such as acrylonitrile or methacrylonitrile. When the core-shell polymer contains the middle stage polymer, the amount thereof is preferably of not more than about 30% by weight based on the core-shell polymer.

The polycarbonate resin composition of the invention comprises: 50-80% by weight of a polycarbonate resin, 20-45% by weight of a poly(1,4-butylene terephthalate) resin and 5-30% by weight of an impact modifier, based on the resin composition, respectively, the three components being in total 100% by weight. More preferably, the polycarbonate resin composition of the invention comprises: 60-70% by weight of a polycarbonate resin, 20-35% by weight of a poly(1,4-butylene terephthalate) resin and 5-20% by weight of an impact modifier, based on the resin composition, respectively.

When the ratio of the amounts of the polycarbonate resins and the poly(1,4-butylene terephthalate) resin is outside the above specified, the resultant resin composition is not improved in impact strength at low temperatures. On the other hand, when the amount of the impact modifier is less than 5% by weight based on the resin composition, the resultant resin composition has an insufficient impact strength, whereas when the amount of the impact modifier is more than 30% by weight based on the resin composition, the resultant resin composition is of insufficient heat resistance, tensile strength and flexural modulus.

The polycarbonate resin composition of the invention may be prepared by blending a polycarbonate resin with a poly(1,4-butylene terephthalate) resin and an impact modifier in the amounts above specified. The method and means for the blending are not specifically limited, however, a melt-blending is preferred wherein the components are blended usually at temperatures of about 200°–260° C. with lower temperatures preferred by means of heat rolls, Bumbury's mixers or, single or twin screw extruders. When extruders are used, it is preferred that the components are pulverized and dried preliminarily and then pelletized. The pellets are dried sufficiently, and then injection-molded. However, the resin composition is not limited specifically in form, and may be in the form of pellets or powders, for example.

Additives may be contained in the resin composition in suitable amounts. The additives include, for example, fire retardants, mold releasing agents, weather resistant agents, antioxidants, antistatic agents, heat resistant agents, pigments, reinforcements, surfactants, fillers and lubricants. Polyolefins may be further contained in the resin composition to impart execellent dispersibility to the composition.

The polycarbonate resin composition of the invention may be molded by known conventional methods such as injection molding or compression molding usually at temperatures of about 230°–300° C.

As set forth above, the polycarbonate resin composition of the invention contains as an impact modifier a core-shell polymer comprising a core composed of a cross-linked rubbery polyalkyl acrylate and a shell composed of a glassy methyl methacrylate polymer, and having an acetone soluble fraction of not more than 3% by weight based on the core-shell polymer, and such a core-shell polymer is likely to retain the core-shell structure when the ingredients are blended or the resultant resin composition is molded. Presumably as results, the resin composition of the invention has an excellent impact strength at very low temperatures as low as −30° C., but also molded articles thereof have high tensile strength and flexural modulus requisite to engineering plastics.

The invention will now be described with reference to examples, which however are not to be construed as limiting to the invention. In the examples, parts are parts by weight unless otherwise designated.

The measurements of the properties of specimens were carried out as follows:

Tensile yield strength was determined using a No. 1 dumbbell specimen at a tensile speed of 50 mm/minute according to JIS K 7113.

Flexural modulus was determined using a speciment of 110 mm in length, 6.4 mm in thickness and 12.8 mm in width with a support distance of 88 mm at a bending speed of 2 mm/minute according to JIS K 7203.

Izod impact strength was determined at temperatures of 23° C. and −30° C., respectively, using a specimen of 3.2 mm in thickness according to JIS K 7110.

Heat distortion temperature was determined under a load of 18.6 kgf/cm$^2$ according to JIS K 7110.

Examples 1–7

A polycarbonate resin prepared by the reaction of 2,2'-bis(4-hydroxyphenyl)propane with phosgene and having a viscosity average molecular weight of about $2.8 \times 10^4$ (Yupilon S-1000, Mitsubishi Gas Kagaku Kogyo K. K., Japan), a poly(1,4-butylene terephthalate) resin of high viscosity grade (PBT 1401×04, Toray K. K., Japan) and an impact modifier, either of A to E as described below were admixed together in amounts as shown in Table 1. The mixture was melt-blended by means of a single screw extruder provided with a cylinder of 30 mm in diameter at a temperature of 235° C. to provide a polycarbonate resin composition in the form of pellets.

The pellets were dried at 120° C. for 4 hours by use of an air drier, and then injection-molded at a molding cylinder temperature of 260° C. and a nozzle temperature of 270° C., to provide specimens. The properties of the specimens are shown in Table 1.

The composition of the impact modifiers used herein were as follows in terms of monomer weight ratios:

Impact modifier A: the core composed of 70 parts of a cross-linked rubbery polyacrylate polymer composed of butyl acrylate/ethylene glycol dimethacrylate/allyl methacrylate in a weight ratio of 68.5/0.5/1.0 and the shell composed of 30 parts of a methyl methacrylate copolymer composed of methyl methacrylate/ethyl acrylate/ethylene glycol dimethacrylate in a weight ratio of 26/3/1, and having a glass transition temperature of 105° C. The acetone soluble fraction of the core-shell polymer was 0.9%.

Impact modifier B: the core composed of 80 parts of a cross-linked rubbery polyacrylate polymer composed of butyl acrylate/ethylene glycol dimethacrylate/allyl methacrylate in a weight ratio of 78.29/0.57/1.14 and the shell composed of 20 parts of a methyl methacrylate copolymer composed of methyl methacrylate/ethyl acrylate/ethylene glycol dimethacrylate in a weight ratio of 17.33/2/0.67, and having a glass transition temperature of 105° C. The acetone soluble fraction of the core-shell polymer was 1.2%.

Impact modifier C: the core composed of 80 parts of a cross-linked rubbery polyacrylate polymer composed of butyl acrylate/1,4-butylene glycol diacrylate/allyl methacrylate in a weight ratio of 78.0/0.40/1.60 and the shell composed of 20 parts of a methyl methacrylate copolymer composed of methyl methacrylate/ethyl acrylate in a weight ratio of 18/2, and having a glass transition temperature of 105° C. The acetone soluble fraction of the core-shell polymer was 2.8%.

Impact modifier D: the core composed of 80 parts of a cross-linked rubbery polyacrylate polymer compsed of butyl acrylate/1,4-butylene glycol diacrylate/diallyl maleate in a weight ratio of 79.2/0.4/0.4 and the shell composed of 20 parts of a methyl methacrylate copolymer composed of methyl methacrylate/1,4-butylene glycol diacrylate in a weight ratio of 19.8/0.2, and having a glass transition temperature of 105° C. The acetone soluble fraction of the core-shell polyer was 2.1%.

Impact modifier E: the core composed of 80 parts of a cross-linked rubbery polyacrylate polymer composed of 2-ethylhexyl acrylate/butyl acrylate/1,4-butylene glycol diacrylate/allyl methacrylate in a weight ratio of 39.72/39.72/0.16/0.40 and the shell composed of 20 parts of a methyl methacrylate copolymer composed of methyl methacrylate/ethyl acrylate/1,4-butylene glycol diacrylate in a weight ratio of 17.33/2/0.67, and having a glass transition temperature of 105° C. The acetone soluble fraction of the core-shell polymer was 2.3%.

Impact modifier F: the core composed of 70 parts of a cross-linked rubbery polyacrylate polymer composed of butyl acrylate/ethylene glycol dimethacrylate in a weight ratio of 69.7/0.3 and the shell composed of 30 parts of a methyl methacrylate copolymer composed of methyl methacrylate/ethyl acrylate in a weight ratio of 27/3, and having a glass transition temperature of 105° C. The acetone soluble fraction of the core-shell polymer was 9.2%.

Impact modifier G: the core composed of 80 parts of a cross-linked rubbery polyacrylate polymer composed of butyl acrylate/1,4-butylene glycol diacrylate/allyl methacrylate in a weight ratio of 79.44/0.16/0.40 and the shell composed of 20 parts of a methyl methacrylate copolymer composed of methyl methacrylate/ethyl acrylate/1,4-butylene glycol diacrylate in a weight ratio of 14/14/2, and having a glass transition temperature of 58° C. The acetone soluble fraction of the core-shell polymer was 2.2%.

Impact modifier HIA-15: Kureha Kagaku Kogyo K. K., Japan, a core-shell polymer with a core of acrylic acid ester graft copolymers and a shell having a glass transition temperature of 105° C. The acetone soluble fraction of the core-shell polymer was 6.2%.

COMPARATIVE EXAMPLES 1-4

The same polycarbonate resin and poly(1,4-butylene terephthalate) resin as before and an impact modifier, A, F, HIA-15 or G as described before were mixed together in amounts as shown in Table 2, and then pelletized in the same manner as in the previous examples.

The pellets were dried at 120° C. for 4 hours by use of an air drier, and then injection molded to provide test pieces. In Comparative Examples 1, 3 and 4, the molding conditions were the same as in Example 1, but in Comparative Example 2, the molding cylinder temperature was 210° C. and the nozzle temperature was 250° C. The properties of the specimens are shown in Table 2.

TABLE 1

|  | Examples | | | | | | |
|---|---|---|---|---|---|---|---|
|  | 1 | 2 | 3 | 4 | 5 | 6 | 7 |
| Resin Composition* | | | | | | | |
| Polycarbonate | 60 | 60 | 70 | 60 | 60 | 60 | 60 |
| Poly(1,4-butylene terephthalate) | 35 | 25 | 20 | 25 | 25 | 25 | 25 |
| Impact modifier | | | | | | | |
| A | 5 | 15 | 10 | — | — | — | — |
| B | — | — | — | 15 | — | — | — |
| C | — | — | — | — | 15 | — | — |
| D | — | — | — | — | — | 15 | — |
| E | — | — | — | — | — | — | 15 |
| F | — | — | — | — | — | — | — |
| HIA-15 | — | — | — | — | — | — | — |
| G | — | — | — | — | — | — | — |
| Properties of Resin Composition | | | | | | | |
| Tensile yield strength (kgf/cm$^2$) | 580 | 530 | 560 | 510 | 540 | 520 | 490 |
| Flexural modulus (kgf/cm$^2$) | 22500 | 20300 | 21800 | 19800 | 20700 | 20500 | 19500 |
| Izod impact strength (kgf · cm/cm) | | | | | | | |
| 23° C., 3.2 mm thick | 95 | 99 | 98 | 101 | 96 | 90 | 108 |
| −30° C., 3.2 mm thick | 60 | 64 | 66 | 66 | 58 | 52 | 69 |
| Heat distortion temperature (°C.) | 106 | 104 | 110 | 100 | 105 | 104 | 98 |

Notes:
*Parts by weight

TABLE 2

|  | Comparative Examples | | | |
|---|---|---|---|---|
|  | 1 | 2 | 3 | 4 |
| Resin Composition* | | | | |
| Polycarbonate | 60 | 25 | 60 | 60 |
| Poly(1,4-butylene terephthalate) | 25 | 60 | 25 | 25 |
| Impact modifier | | | | |
| A | — | 15 | — | — |
| B | — | — | — | — |
| C | — | — | — | — |
| D | — | — | — | — |
| E | — | — | — | — |
| F | 15 | — | — | — |
| HIA-15 | — | — | 15 | — |
| G | — | — | — | 15 |
| Properties of Resin Composition | | | | |
| Tensile yield strength (kgf/cm$^2$) | 530 | 470 | 580 | 440 |
| Flexural modulus (kgf/cm$^2$) | 20300 | 21300 | 21800 | 18600 |
| Izod impact strength (kgf · cm/cm) | | | | |
| 23° C., 3.2 mm thick | 90 | 100 | 79 | 88 |
| −30° C., 3.2 mm thick | 5 | 5 | 9 | 51 |
| Heat distortion temperature (°C.) | 105 | 66 | 110 | 87 |

Notes:
*Parts by weight

What is claimed is:

1. A polycarbonate resin composition which comprises:
   50–80% by weight of a polycarbonate resin,
   20–45% by weight of a poly(1,4-butylene terephthalate) resin and
   5–30% by weight of an impact modifier, based on the resin composition, respectively, the impact modifier being a core-shell polymer comprising a core composed of a cross-linked rubbery polymer of an alkyl acrylate wherein the alkyl has 2–8 carbons and a shell composed of a homopolymer or a copolymer of methyl methacrylate which has a glass transition temperature of not less than 60° C., and the core-shell polymer having an acetone soluble fraction of not more than 3% by weight based on the core-shell polymer.

2. The polycarbonate resin composition as claimed in claim 1, wherein the core is cross-linked with a cross linkable monomer in amounts of about 0.01–5% by weight based on the monomers used.

3. The polycarbonate resin composition as claimed in claim 1, wherein the copolymer is a copolymer of methyl methacrylate with at least one of aromatic monovinyl monomers, monovinyl cyanide monomers, acrylate monomers and methacrylate monomers other than methyl methacrylate.

4. The polycarbonate resin composition as claimed in claim 1, wherein the shell is a cross-linked homopolymer or a cross-linked copolymer of methyl methacrylate.

5. The polycarbonate resin composition as claimed in claim 4, wherein the shell is a cross-linked homopolymer or copolymer prepared with a cross linkable monomer in amounts of about 0.01–5% by weight based on the monomers used.

* * * * *